3,182,092
PREPARATION OF TETRAHALOMETHANES
Robert Neville Haszeldine, Disley, England, and Hyman Iserson, Springfield Township, Montgomery County, Pa., assignors to Pennsalt Chemicals Corporation, Philadelphia, Pa., a corporation of Pennsylvania
No Drawing. Filed May 21, 1959, Ser. No. 814,683
Claims priority, application Great Britain, Oct. 12, 1955, 29,117/55
4 Claims. (Cl. 260—653)

This invention pertains to an improved method for the preparation of tetrahalomethanes, particularly of chlorofluoromethanes. This application is a continuation-in-part of application Serial No. 606,542, filed August 25, 1956, now abandoned.

Tetrahalomethanes, such as carbon tetrachloride, fluorotrichloromethane, difluorodichloromethane, chlorotrifluoromethane and tetrafluoromethanes and their bromofluoro analogs are useful in a variety of industrial applications, such for example, as fire extinguishers, solvents and refrigerants. A cheap, simple way of making such materials is much in demand.

The present invention provides a method for making tetrafluoromethanes such as chlorofluoromethanes and bromofluoromethanes which comprises heating a carbonyl compound of the general formula $$\begin{array}{c} Y \\ \diagdown \\ \phantom{X}C=O \\ \diagup \\ X \end{array}$$

with a fluorocarbonyl compound having the general formula $$\begin{array}{c} F \\ \diagdown \\ \phantom{X}C=O \\ \diagup \\ X \end{array}$$

where X is selected from the group consisting of fluorine, chlorine and bromine and Y is selected from the group consisting of chlorine and bromine.

The method of the invention is of particular importance as applied to the formation of halogenated methanes of the type $$CF_nCl_{4-n}$$

where $n$ is from 1 to 3.

Reactions typical of the present invention are:

(1)    $COCl_2 + COF_2 \rightarrow CF_2Cl_2 + CO_2$
(2)    $2COFCl \rightarrow CF_2Cl_2 + CO_2$
(3)    $COBr_2 + COF_2 \rightarrow CF_2Br_2 + CO_2$
(4)    $2COFBr \rightarrow CF_2Br_2 + CO_2$
(5)    $COBr_2 + COFCl \rightarrow CFClBr_2 + CO_2$ In addition to the products listed above, other tetrahalomethanes may be formed such as $CF_3Cl$, $CFCl_3$, $CF_3Br$, $CFBr_3$, $CF_4$, $CCl_4$, and $CBr_4$. The mechanism which results in the formation of these compounds is not fully understood.

As well as the direct reaction of COXY with COFX to give the tetrahalomethanes and $CO_2$ directly, as indicated for example in Equations 1 and 3 above, it is possible that COFY is, in part, an intermediate product (e.g., $COF_2 \rightleftharpoons 2COFY$), which, in turn enters into the following reactions:

(6)    $COFY + COF_2 \rightarrow CF_3Y + CO_2$
(7)    $COFY + COY_2 \rightarrow CFY_3 + CO_2$ Similarly, when COFY is heated alone, the direct disproportionation of COFY into the tetrahalomethanes and $CO_2$ (e.g., Equations 2 and 4 above) can be accompanied by the setting up of equilibria of the type $$2COFY \rightleftharpoons COF_2 + COY_2$$

with subsequent reactions of the $COF_2$ and $COY_2$, as indicated in Equations 1, 3, 5, 6, 7, above.

The following equilibria are also of importance:

(8)    $2CF_2Y_2 \rightleftharpoons CF_3Y + CFY_3$ $$\Updownarrow \qquad \Updownarrow$$

$\tfrac{1}{2}CF_2Y_2 + \tfrac{1}{2}CF_4 \quad (9) \quad \tfrac{1}{2}CF_2Y_2 + \tfrac{1}{2}CY_4$ (10)

In Reactions 1 and 3 the $COF_2$ may be formed in situ by the reaction between $COY_2$ and HF, as follows:

(11)    $COY_2 + 2HF \rightarrow COF_2 + 2HY$

The $COF_2$ thus formed then reacts with the $COY_2$ as indicated above. Thus, the overall reaction may be written:

(12)    $2COY_2 + 2HF \rightarrow CF_2Y_2 + CO_2 + 2HY$

The invention therefore also includes a method of making bromo- and chlorofluoromethanes by reacting compounds of the general formula $COY_2$ with HF.

Similarly, in Reaction 1, the phosgene may be replaced by CO and $Cl_2$ which react according to the equation:

(13)    $CO + Cl_2 \rightarrow COCl_2$ to form phosgene in situ. The phosgene then reacts with $COF_2$ as indicated. Thus, the overall reaction may be written:

(14)    $CO + Cl_2 + COF_2 \rightarrow CF_2Cl_2 + CO_2$

The invention therefore includes a process for making fluorochloromethanes by reacting carbonyl fluoride with carbon monoxide and chlorine.

From Reactions 12 and 14 it can be seen that chlorofluoromethanes can be made from carbon monoxide, hydrogen fluoride and chlorine, in accordance with the equation:

(15)    $2CO + 2Cl_2 + 2HF \rightarrow CF_2Cl_2 + CO_2 + 2HCl$

The invention therefore further includes a process for making chlorofluoromethanes by reacting hydrogen fluoride with chlorine and carbon monoxide.

Although Reactions 12, 14 and 15 have been shown as yielding only $CF_2Cl_2$, it will be understood that the other tetrahalomethanes referred to above may also be present in the reaction products and, under certain conditions, may be present in greater proportions than $CF_2Cl_2$. The proportions of the various compounds obtained in the product will depend on the conditions of reactions, and on the type of catalyst used, as described in more detail below.

The novel processes can be carried out under flow or batch conditions at temperatures between about 250° C. and about 1400° C. When a flow process is used, the temperature is preferably between about 400° C. and about 800° C. Under batch conditions, the temperature is usually between about 300° C. and about 700° C., preferably between about 350° C. and about 500° C. With either process, and especially when HF is a reactant, the reaction can be carried out advantageously at temperatures below 550° C.

Pressure is not a critical consideration and the reactions may be performed at atmospheric pressure. However, elevated pressure, such as pressures up to about 7500 p.s.i.g. or even higher, are preferred as increasing the yield. Preferably pressures between about 700 and 4500 p.s.i.g. will be used.

When the reaction involves two different carbonyl halides, the mole ratio of the two carbonyl halides will, in general, be within the range from 10:1 to 1:10; usually, however, the two carbonyl halides will be used in approximately stoichiometric proportions although in certain cases it may be expedient to use an excess of one carbonyl halide, for example as in Reactions 1, 3 and 12, when an excess of phosgene or carbonyl bromide may be employed, say between about 1 and about 10 times the stoichiometric equivalent.

The reaction time required is simply that necessary to produce economical yields. It may vary from a few seconds in the case of a flow process to on the order of 24 hours for a batch process.

As pointed out, the reactions may be performed with or without a catalyst. However, use of a catalyst increases the reaction rate to a considerable extent. The catalyst of choice is activated carbon. In using a carbon catalyst, it is preferable to remove residual amounts of ash, volatile matter and water which may be present in commercial products and which will react with phosgene, fluorophosgene, chlorofluorophosgene or hydrogen fluoride. Commercially available activated carbon can be made suitable for catalysis of the present reactions by treating it with anhydrous HF and then placing it under vacuum of say 0.1 to 10 mm. Hg at an elevated temperature (e.g., 200–400° C.) for from say ¼ to 10 hours.

The yield of halomethanes can be increased to some extent by impregnating the purified carbon with the halide of a transition element, such as iron, vanadium, cobalt, or nickel, or with aluminum halide. Examples of suitable halides of transition elements are ferric chloride, ferric fluoride, and mixtures thereof. The use of such materials, however, under certain conditions tends to promote Reactions 8, 9, and 10 to form $CF_3Cl$, $CFCl_3$, $CBr_3F$, $CF_2Br$, $CBr_4$, $CF_4$, and $CCl_4$.

In Reactions 1, 3, 5 and 12, it may be desirable to add a small amount, say from about 0.1 to about 3 moles per mole of $COCl_2$ or $COBr_2$, of chlorine or bromine to the reactants to suppress dissociation of the phosgene or bromophosgene according to the reactions:

(16) $COCl_2 \rightleftharpoons CO + Cl_2$
(17) $COBr_2 \rightleftharpoons CO + Br_2$ Similarly, if it is desired to suppress Reactions 8, 9 and 10, as when $CF_2Y_2$ is the desired product, the disproportionation products $CF_2Y$, $CF_4$, $CY_3F$, and $CY_4$ may be added to the reactor along with the primary reactants.

The invention is further described in the accompanying specific examples. It will be understood that these examples are given for purposes of illustration only, and are not to be taken as in any way restricting the invention beyond the scope of the appended claims.

Example I

A platinum-lined nickel tube, 30″ long x 0.75″ I.D. was filled with pellets of activated carbon of a size about 0.1 to 0.5″ and heated in a tube furnace. The temperature was determined by thermo-couples which were held against the outside of the nickel tube.

0.22 mole $COF_2$ and 0.21 mole $COCl_2$ were passed in a stream of $N_2$ into the hot tube over a period of 4.5 hours. The temperature of the tube was 260 to 400° C. The product gas contained 10% of $CF_2Cl_2$, $COCl_2$, $COF_2$, and $CO_2$.

Example II

The procedure of Example I was carried out using 0.1 mole of $COF_2$ and 0.1 mole of $COCl_2$. The temperature ranged from 320° C. to 370° C. over a period of 2.2 hours. The exit gases were condensed in traps cooled with liquid oxygen, then washed through 15% aqueous potassium hydroxide. Spectroscopic analysis of the washed gases showed them to be (mole percents) $CF_2Cl_2$ 50%, $COCl_2$ 10%, $CO_2$ 40%, and a little $CF_4$.

Example III

A carbon tube, 30″ long, 0.75″ I.D., 0.37″ wall thickness, was used as the reaction chamber. It was filled with activated carbon pellets which had been used in an earlier run and inserted in a nickel tube; the annular space between the tubes was filled with powdered graphite and fitted with graphite asbestos packing at each end. The two ends of the nickel tube were fitted with caps which were connected to ¼″ tubing which served as the inlet and outlet tubes. A Monel thermowell, equipped with thermocouples, was welded to the outside of the nickel tube. The tube was heated in a 36″ tube furnace.

0.24 mole $COF_2$ and 0.66 mole $COCl_2$ were released from small cylinders into a mixing vessel from which they passed into the inlet tube of the reactor over a period of six hours. The temperature of the reactor was 665° C. at its hottest point. The gaseous products, collected in liquid oxygen-cooled traps, were examined by infra-red spectroscopy which showed them to consist of (mole percents) 5–10% $CO_2$, 50% $COCl_2$, 5–10% $COF_2$, 10–20% $COFCl$, 10% $SiF_4$, and 10% chlorofluoromethanes. It was then washed through 15% aqueous KOH. Infrared analysis of the gases which passed through the KOH showed them to be (mole percents) 40% $CF_2Cl_2$, 20% $CF_3Cl$, and 40% $CF_4$.

Example IV

The procedure of Example III was carried out using 0.07 mole of $COF_2$ and 0.1 mole of $COCl_2$. The temperature ranged from 660° C. to 690° C. over a period of 0.5 hour. 6% conversion of $CF_2Cl_2$ and $CF_2Cl$ was obtained.

Example V

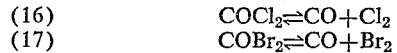

About 35 g. activated carbon of the type used in Example I was placed in an 0.11 stainless steel autoclave which was then charged under vacuum with 0.36 mole $COF_2$ and 0.42 mole $COCl_2$. The autoclave was then heated at 435° C. for 14.5 hours after which it was cooled to room temperature and vented to traps cooled in liquid oxygen. An infrared analysis of the gaseous product showed about 10% $CO_2$, 20% $COF_2$, 20% $COCl_2$, 25% $COFCl$ and 25% chlorofluoromethanes. This gas was washed with 15% aqueous caustic and the gas which passed through the alkali was again examined by infrared and found to contain (mole percents) 35% $CF_2Cl_2$, 43% $CF_3Cl$ and $CF_4$.

Example VI

A 0.3 liter stainless steel autoclave was charged with 85 g. activated carbon and 10 ml. anhydrous HF were added. The autoclave was placed in a heated shaker, heated at 225° for one hour and then evacuated while still hot for 0.75 hour. 1.43 mole $COCl_2$ and 0.2 mole $COF_2$ were added under vacuum and the bomb was then heated for 8 hours in a fused salt bath at 425° C. At this temperature the pressure was calculated to be about 7275 p.s.i.g. The bomb was cooled to room temperature, vented to liquid oxygen-cooled traps until it was at atmospheric pressure, and then heated to 250° C. in vacuo. An appreciable amount of liquid remained in the trap after it had been allowed to reach room temperature. The liquid was removed, washed with 2% $Na_2CO_3$, dried and distilled to give 21 g. B.P. 74–77° C., $n_D^{24}$ 1.4570, identified spectroscopically as carbon tetrachloride. 2.2 g. of crude $C_2Cl_6$ remained in the stillpot.

An infrared spectrum of the product which had volatilized when the product trap had been allowed to reach room temperature showed $CF_2Cl_2$, $CF_3Cl$, $CF_4$, $COCl_2$ and $CCl_4$. This material was washed with aqueous KOH and the unabsorbed gases were found to consist of 50% $CF_2Cl_2$, 25% $CF_3Cl$, 10% $CFCl_3$, 8% $CF_4$, 5% $CCl_4$ and 2% $COCl_2$. The conversions to chlorofluoromethanes were 45% $CF_2Cl_2$, 22.5% $CF_3Cl$, 9% $CFCl_3$ and 7.5% $CF_4$, a total of 84% $CF_{n+1}Cl_{3-n}$.

Example VII

The procedure of Example VI was carried out using 0.3 mole $COCl_2$ and 0.11 mole $COF_2$. 110 grams of catalyst were used. The temperature was 425° C. and the time of reaction was 17.5 hours. The observed pressure was 1425 p.s.i.g. The gaseous product contained (mole percents) 50% $CF_2Cl_2$, 30% $CF_3Cl$, 5% $CFCl_3$, and 15% $CF_4$.

Example VIII

A 0.1 liter stainless steel autoclave was charged with 63 g. activated carbon catalyst which had been used in an earlier experiment and which had been impregnated with ferric chloride so that the percentage of ferric chloride in the catalyst mass was 26–27%. 0.33 mole $COCl_2$, 0.13 mole $COF_2$ and 3 g. $Cl_2$ were then introduced under vacuum, and the bomb was heated in a fused salt bath at 425° C. for six hours. At this temperature the pressure was calculated to be about 6310 p.s.i.g. The products were removed as described in Example VI and were washed through 25% aqueous KOH. An infrared spectrum of a portion of the product which did not react with the alkali showed the presence of 40% $CF_2Cl_2$, 25% $CF_3Cl$, 30% $CFCl_3$, 5% $CF_4$, traces of $COCl_2$ and $CO_2$. The conversions to chlorofluoromethanes were 34% $CF_2Cl_2$, 21% $CF_3Cl$, 25% $CFCl_3$ and 4.5% $CF_4$ or a total of 84.5% $CF_{n+1}Cl_{3-n}$. About 3 g. $CCl_4$ were also obtained.

Example IX 30.5 g. COFCl (90–95% pure, 0.34 mole) were distilled under vacuum into a 0.1 liter stainless steel autoclave which was then heated in a fused salt bath at 420° C. for 8.5 hours. The autoclave was vented as described in Example VI. An infrared spectrum of the crude product showed approximately 45% $COCl_2$, 30% COFCl, 5% $COF_2$, 15% $CF_2Cl_2+CF_3Cl$, and 50% $CO_2$. The crude gas was washed through 15% aqueous KOH, introduced into a vacuum system, and a sample was taken for an infrared analysis. The spectrum showed (mole percents) less than 5% $COCl_2$, a trace of $CF_4$, 65–70% $CF_2Cl_2$ and 30% $CF_3Cl$.

Example X

A 0.1 liter stainless steel autoclave was charged with 60 g. activated carbon which has been impregnated with ferric chloride so that the amount of ferric chloride in the catalyst was 26–27%. Thirty-nine grams anhydrous hydrogen fluoride were added to the autoclave which was then heated at 300° and then evacuated. It was then cooled in a liquid oxygen bath and 30 g. COFCl (85% pure, 0.31 mole) were introduced under vacuo. The bomb was heated in a fused salt bath at 425° for 19 hours, at a calculated pressure of about 3565 p.s.i.g., cooled, and vented, finally with evacuation to liquid oxygen-cooled traps. An infrared spectrum of the exit gas showed the presence of $COCl_2$, COFCl, $CF_3Cl$, $CF_2Cl_2$, $COF_2$, $CCl_4$, and $CO_2$. This crude product was washed twice with 25% aqueous KOH and the washed gas was found to contain 20% $CF_4$, 60% $CF_3Cl$ and 20% $CF_2Cl_2$. The conversions, calculated on the basis that one mole of COFCl yields one mole of chlorofluoromethanes were: 12.5% $CF_2Cl_2$, 37.5% $CF_3Cl$ and 12.5% $CF_4$.

Example XI

One hundred and two grams of activated carbon pellets which had been impregnated with 26–27% by weight of ferric chloride were placed in a 0.3 liter Monel bomb. The catalyst was pretreated with 27 g. HF and the bomb was evacuated at 275° C. The autoclave was cooled in liquid oxygen and 60 g. $COCl_2$, 12.5 g. anhydrous HF and 7.5 g. chlorine were introduced under vacuum. The vessel was heated at 425° C. for 17 hours at a calculated pressure of 4720 p.s.i.g., cooled, and vented to a train consisting of sodium thiosulfate solution, 25% aqueous KOH and liquid oxygen-cooled traps until it was at atmospheric pressure. Venting was completed by heating the bomb to 275° while evacuating it through a liquid oxygen-cooled trap. An infrared spectrum of a representative sample of the aqueous alkali washed product showed 75% $CF_3Cl$, 5% $CF_2Cl_2$, 5% $CF_4$ and a trace of phosgene. The conversions were 13.5% $CF_2Cl_2$, 53.5% $CF_3Cl$ and 3.5% $CF_4$, or a total of 70.5% $CF_{n+1}Cl_{3-n}$.

Example XII

One hundred and twenty grams of $FeCl_3$-impregnated carbon which had been used in several previous reactions of $COF_2$ and $COCl_2$ were used as the catalyst. The bomb was evacuated, charged with 60 g. $COCl_2$, 12 g. anhydrous HF and 7 g. chlorine, and heated for 6 hours at 350° C. and 4070 p.s.i.g. (calculated) in a fused salt bath. It was then cooled and vented through a sodium fluoride packed tube to a liquid oxygen-cooled trap until it was at atmospheric pressure. The bomb was then heated to 250° C. and evacuated through a trap cooled in liquid air. The weight of crude product was 69.5 g. This material was washed through aqueous sodium thiosulfate and 25% aqueous KOH to give 22.5 g. of washed product. About 6 g. of the crude did not volatilize into the wash solutions and this material was found to be mostly carbon tetrachloride. An infrared analysis of the washed gases showed that they contained about 70% $CF_2Cl_2$, 20% $CF_3Cl$, 10% $CFCl_3$ and a trace of $CF_4$. The conversions were therefore 45% to $CF_2Cl_2$, 13% to $CF_3Cl$, 7% to $CFCl_3$, or a total of 67% $CF_{n+1}Cl_{3-n}$.

Example XIII

The procedure of Example XII was carried out using 0.25 mole each of $COCl_2$ and anhydrous HF and 0.05 mole of $Cl_2$. 100 grams of activated carbon impregnated with $FeCl_3$ which had been used for two previous runs were used as catalyst. The temperature was 345° C. and the reaction time was 6.25 hours. The observed pressure was 850 p.s.i.g. Conversions based on $COCl_2$ were 22% to $CF_2Cl_2$, 17% to $CF_3Cl$, 2.5% to $CFCl_3$ and 2% to $CF_4$.

Example XIV

The procedure of Example XII was carried out using 0.5 mole $COCl_2$, 0.45 mole HF (anhydrous) and 0.1 mole $Cl_2$. 100 grams of activated carbon impregnated with $FeCl_3$ used in a previous run were used as catalyst. The temperature was 340° C. and reaction time was 6.25 hours. The observed pressure was 2000 p.s.i.g. Conversions based on $COCl_2$ were 33.5% to $CF_2Cl_2$, 20% to $CF_3Cl$, 10% to $CFCl_3$ and 3.5% to $CF_4$.

Example XV

One hundred grams activated carbon pellets were placed in a 300 ml. nickel autoclave, 30 g. anhydrous HF was added and the autoclave was heated at 350° C. for 1.5 hours while it was evacuated. It was then cooled in liquid nitrogen and 152 g. $CF_2Cl_2$ was introduced under vacuum. The bomb was put into a stirred, fused salt bath which was kept at 350° C. for six hours. The maximum pressure (observed) was 2925 p.s.i.g. The autoclave was removed, cooled, vented, and a sample of the exit gas was taken for infrared spectroscopic analysis. From the analytical data, it was calculated that there was present 6.1 g. $CF_3Cl$, 10.1 g. $CFCl_3$ and 132.8 g. $CF_2Cl_2$.

Example XVI

One hundred grams of catalyst were prepared as described in Example XV. One hundred and fifty-two g. of $CF_2Cl_2$ were introduced and the reaction was run as in Example XV except that the maximum pressure (observed) was about 3350 p.s.i.g. Venting of the autoclave yielded 128 g. of material of which 13 g. was nonvolatile. Analysis of infrared spectroscopy technique showed that there had been removed from the autoclave 79.6 g.

$CF_2Cl_2$, 17.3 g. $CF_3Cl$, 18 g. $CFCl_3$, 15.8 g. $CCl_4$ and some $CF_4$.

We claim:
1. A method for making tetrahalomethanes which comprises reacting a carbonyl halide having the general formula

where X is selected from the group consisting of fluorine, chlorine and bromine and Y is selected from the group consisting of chlorine and bromine, with a fluorocarbonyl compound having the general formula

where X is as defined above, in the presence of an activated carbon catalyst containing the halide of a transition element, at a temperature at between about 250° C. and 1400° C.

2. A method for making fluorochloromethanes which comprises reacting phosgene with carbonyl fluoride in the presence of an activated carbon catalyst containing the halide of a transition element, at a temperature of between about 250° C. and 1400° C.

3. A method for making fluorochloromethanes which comprises reacting phosgene with carbonyl fluoride at a temperature of between about 250° C. and 1400° C., said phosgene being formed in situ by reacting carbon monoxide and chlorine.

4. A method for making fluorochloromethanes which comprises pyrolyzing COFCl in the presence of an activated carbon catalyst containing the halide of a transition element, at a temperature of between about 250° C. and 1400° C.

References Cited by the Examiner
UNITED STATES PATENTS 2,709,189  5/55  Farlow et al. _____ 260—653
2,757,213  7/56  Coffman et al. _____ 260—653.7
2,757,214  7/56  Muetterties _____ 260—653.8
2,836,622  5/58  Tullock _____ 260—653.7

OTHER REFERENCES

Ruff et al.: "Z. Anorg. Chem." 242 (1939), pp.272–6.

LEON ZITVER, *Primary Examiner*.

ALLAN M. BOETTCHER, ALPHONSO D. SULLIVAN, *Examiners*.